US012515572B2

(12) United States Patent
Kim et al.

(10) Patent No.: US 12,515,572 B2
(45) Date of Patent: Jan. 6, 2026

(54) REFRIGERATOR FOR VEHICLE AND VEHICLE

(71) Applicant: LG ELECTRONICS INC., Seoul (KR)

(72) Inventors: Daewoong Kim, Seoul (KR); Jangseok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 639 days.

(21) Appl. No.: 17/475,947

(22) Filed: Sep. 15, 2021

(65) Prior Publication Data

US 2022/0001786 A1 Jan. 6, 2022

Related U.S. Application Data

(63) Continuation of application No. 16/481,161, filed as application No. PCT/KR2018/001383 on Feb. 1, 2018, now Pat. No. 11,148,574.

(30) Foreign Application Priority Data

Feb. 2, 2017 (KR) ........................ 10-2017-0014983

(51) Int. Cl.
*B60N 3/10* (2006.01)
*F25D 23/00* (2006.01)

(52) U.S. Cl.
CPC ........... *B60N 3/104* (2013.01); *F25D 23/003* (2013.01)

(58) Field of Classification Search
CPC ........ F25D 23/003; F25D 23/006; F25D 3/08; F25D 2323/024; F25D 2323/0021;
(Continued)

(56) References Cited

U.S. PATENT DOCUMENTS 2,181,856 A * 11/1939 Mccloy .................. F25B 41/37
62/449
2,522,623 A 9/1950 Kas
(Continued)

FOREIGN PATENT DOCUMENTS

CN 1066815 12/1992
CN 2691933 4/2005
(Continued)

OTHER PUBLICATIONS

Machine English language ttranslation of KR20100124116 to Kim et al., translated Mar. 2024 (Year: 2010).*
(Continued)

*Primary Examiner* — Cassey D Bauer
(74) *Attorney, Agent, or Firm* — KED & ASSOCIATES, LLP

(57) ABSTRACT

Provided is a refrigerator for a vehicle. The refrigerator for the vehicle may include a cavity or a compartment accommodating a product, a machine room defined in a side of the cavity, a compressor provided at a front side of an internal section of the machine room to compress a refrigerant, a condensation module or assembly disposed at a rear side of the internal section of the machine room to condense the refrigerant, an evaporation module in which the refrigerant condensed in the condensation module is supplied and evaporated and which is disposed in the cavity, and a machine room cover covering the machine room to enable air to be suctioned from a rear side thereof.

18 Claims, 15 Drawing Sheets

(58) Field of Classification Search
CPC ..... F25D 2323/00284; F25D 2321/023; B60N 3/103; B60N 3/104; F25B 41/37; F25B 39/04; F25B 2321/023; F24F 1/38
See application file for complete search history.

(56) References Cited

U.S. PATENT DOCUMENTS

| | | | | |
|---|---|---|---|---|
| 2,532,234 | A | 11/1950 | Kimble | |
| 4,545,211 | A | 10/1985 | Gaus | |
| 5,157,893 | A * | 10/1992 | Benson | B64G 1/22 52/789.1 |
| 7,703,824 | B2 | 4/2010 | Kittelson | |
| 8,418,492 | B2 | 4/2013 | Cieslik et al. | |
| 2003/0079491 | A1 * | 5/2003 | Wang | F25D 23/006 62/506 |
| 2006/0174645 | A1 * | 8/2006 | Erisgen | F28F 9/002 62/297 |
| 2009/0058120 | A1 | 3/2009 | Ioka et al. | |
| 2012/0103006 | A1 * | 5/2012 | Jung | F25D 23/062 62/440 |
| 2015/0153097 | A1 * | 6/2015 | Koo | F25D 23/003 62/428 |
| 2016/0356532 | A1 | 12/2016 | Wijaya | |
| 2018/0178629 | A1 | 6/2018 | Suzuki | |

FOREIGN PATENT DOCUMENTS

| | | | |
|---|---|---|---|
| CN | 101376356 | 3/2009 | |
| CN | 101376357 | 3/2009 | |
| CN | 101486336 | 7/2009 | |
| CN | 101568783 | 10/2009 | |
| CN | 205580064 | 9/2016 | |
| DE | 34 12 556 | 10/1985 | |
| EP | 0479251 | 4/1992 | |
| GB | 2 232 756 | 12/1990 | |
| JP | 50-36168 | 4/1975 | |
| JP | S55105166 | 8/1980 | |
| JP | 56-40061 | 4/1981 | |
| JP | S6154331 | 3/1986 | |
| JP | H 02-034424 | 2/1990 | |
| JP | 2003-279218 | 10/2003 | |
| JP | 2007240015 A * | 9/2007 | |
| JP | 2012-067686 | 4/2012 | |
| KR | 20100124116 A * | 11/2010 | F28F 1/325 |

OTHER PUBLICATIONS

English language translation of JP2007240015 to Koshiro. Translated Jan. 2025 (Year: 2007).*

International Search Report and Written Opinion dated Jun. 12, 2018 issued in Application No. PCT/KR2018/001383.

European Search Report issued in Application No. 18747983.7 dated Oct. 2, 2020.

U.S. Office Action dated Jan. 4, 2021 issued in parent U.S. Appl. No. 16/481,161.

Chinese Office Action dated Feb. 3, 2021 issued in Application No. 201880009109.8.

* cited by examiner (a)

(b)

(c)

REFRIGERATOR FOR VEHICLE AND VEHICLE

CROSS-REFERENCE TO RELATED APPLICATIONS

This application is a Continuation Application of U.S. patent application Ser. No. 16/481,161, filed on Jul. 26, 2019, which is a U.S. National Stage Application under 35 U.S.C. § 371 of PCT Application No. PCT/KR2018/001383, filed in Korea on Feb. 1, 2018, which claims priority to Korean Patent Application No. 10-2017-0014983, filed in Korea on Feb. 2, 2017, whose entire disclosures are hereby incorporated by reference.

BACKGROUND

1. Field

The present disclosure relates to a refrigerator for a vehicle and a vehicle.

2. Background

Refrigerators are apparatuses for storing products such as foods received in the refrigerator at a low temperature including sub-zero temperatures. As a result of this action, there is an advantage that a user's access or intake with respect to the products may be improved, or a storage period of the products may be lengthened.

Refrigerators are classified into indoor refrigerators using a commercial power source or outdoor refrigerators using a portable power source. In addition, in recent years, a refrigerator for a vehicle, which is used after it is fixedly mounted on the vehicle, is increasing in supply. The refrigerator for the vehicle is further increasing in demand due to an increase in supply of vehicles and an increase in premium-class vehicles.

A conventional configuration of the refrigerator for the vehicle will be described.

First, there is an example in which heat in the refrigerator is forcibly discharged to an outside of the refrigerator by using a thermoelement. However, there is a limitation in that a cooling rate is slow due to low thermal efficiency of the thermoelement, which may deteriorate user's satisfaction.

For another example, there is an example in which a refrigerant or cold air is drawn from an air conditioning system installed for air-conditioning an entire interior of the vehicle and used as a cooling source for the refrigerator for the vehicle.

In this example, there is a disadvantage that a separate flow path of air or refrigerant is required to draw the air or refrigerator from the air conditioning system of the vehicle. Also, there is a limitation that low-temperature energy is lost during the movement of the air or refrigerant through the flow path. Also, there is a limitation that a position at which the refrigerator for the vehicle is installed is limited to a position that is adjacent to the air conditioning system of the vehicle due to the above-described limitations.

For another example, there is an example in which a refrigeration cycle using a refrigerant is applied. However, in this example, since a part constituting the refrigeration cycle is large in size, most of the parts are mounted on a trunk, and only a door of the refrigerator is opened to the inside of the vehicle. In this case, there is a limitation that a position for installing the refrigerator for the vehicle is limited. Also, there is a limitation that the trunk is significantly reduced in volume to reduce an amount of cargo that is capable of being loaded in the trunk.

U.S. Pat. Registration No. 4,545,211 may show a representative example of the above-mentioned example. The technology of the cited document has the following limitations.

First, there is a limitation in that an internal volume of the vehicle refrigerator is reduced due to a large volume of the machine room. There is a limitation that the driver may not use the vehicle refrigerator without stopping the driving when the driver alone drives the vehicle because the refrigerator is installed in the back seat, and also, since the door is opened forward, there is inconvenience that it may not put an object in the front. Since the cooling in the refrigerator is performed by direct cooling, that is, by natural convection, it takes a long time to cool the product. Since the machine room is directly opened to the outside, there is a high possibility that foreign substances are mixed into the inside of the machine room to cause a failure. There is a limitation that the suctioned air is mixed again because the suction and exhaust of the air are not separated from each other to deteriorate heat efficiency. There is a limitation that inconvenience is caused to the user due to noise of the machine room according to use of the compressor.

Embodiments also provide a vehicle refrigerator to which a driver is directly accessible while using a refrigeration cycle, and a vehicle.

Embodiments also provide a vehicle refrigerator that is capable of increasing a capacity of the refrigerator, and a vehicle.

Embodiments also provide a vehicle refrigerator that is capable of solving a limitation in which products accommodated in the refrigerator is slowly cooled, and a vehicle.

Embodiments provide a vehicle refrigerator that is capable of improving energy efficiency, and a vehicle.

Embodiments also provide a vehicle refrigerator that is capable of blocking an access of foreign substances, and a vehicle.

In one embodiment, a refrigerator for a vehicle includes a machine room disposed at a side of a cavity or a compartment, a compressor and a condensation module or assembly, which are respectively disposed at front and rear sides of the machine room, an evaporation module or assembly disposed in the cavity, and a machine room cover covering the machine room to enable air to be suctioned from a rear side thereof. The vehicle refrigerator may have high efficiency in a narrow space.

The condensation module may be divided into three parts such as a condenser, a spacer, and a condensation fan, through which the air suctioned from the rear side successively passes, to secure sufficient condensing performance even in low flow resistance. A suction part of the spacer may have a rectangular shape, and a discharge part may have a circular shape. Thus, a plurality of fins are entirely utilized to better improve heat exchange efficiency. The spacer may have a width of about 5 mm to about 10 mm so that sufficient air flow is guided to the fins.

A dryer or drier and an expansion valve may be disposed in a spacing part between the compressor and the condensation module to further improve space utilization even in the narrow space. A receiver driver may be applied as the dryer to more improve the space utilization.

A vacuum adiabatic body that improves adiabatic effect even with a narrow adiabatic thickness may be applied to a wall of the cavity. Thus, the sufficient adiabatic performance may be obtained in the narrow inner space of the vehicle. The vacuum adiabatic body may have an inner pressure of about $1.8\times10^{-6}$ Torr to about $4.5\times10^{-3}$ Torr to prevent the adiabatic performance from being deteriorated due to radiation heat transfer.

The evaporation module may be accommodated into a rear portion of the cavity to accommodate the product in the front space of the refrigerator to be easily accessible to a user, thereby improving the space utilization.

In another embodiment, a vehicle includes: a console disposed in a spacing part between the seats and having a console space therein; a suction port disposed in a side of the console, which faces a driver; an exhaust port disposed in a side of the console, which faces an assistant driver or a passenger; a refrigerant bottom frame or a refrigerator base disposed on a lower portion the console space; a cavity defined in a side facing the suction port above the refrigerator bottom frame and accommodating a product; and a machine room defined in a side facing the exhaust port above the refrigerator bottom frame. Thus, the refrigerator may be realized in a narrow space without having an influence on the driver.

The vehicle includes: an evaporation module or assembly accommodated in a cavity or a compartment; a compressor, a condensation module or assembly, and an expansion valve expanding the refrigerant condensed in the condensation module, which are disposed in the machine room; and a refrigerant conduit connecting the compressor to the condensation module and connecting the expansion valve to the evaporation module to mount a high-efficiency refrigeration system using a refrigerant.

A machine room cover that partitions the machine room with respect to other parts may be provided to utilize the narrow space with high efficiency and improve cooling performance using air.

In the condensation module, a condenser may be disposed to come into contact with the machine room cover, and a spacer and a condensation fan may be disposed at a front side of the condenser, i.e., a front side of a flow direction or a front side of the vehicle. According to the above-described constituents, the air flow within the machine room may be optimized to improve the cooling performance and the space utilization.

The condensation module may be disposed at a rear side of the machine room, and the compressor may be disposed at a front side of the machine room to provide an air flow corresponding to a heat generation amount and cooling performance for each part. Thus, the compressor may be finally cooled. In this case, heat may not have an influence on performance of the compressor.

The vehicle may further include a machine room bottom frame or base supporting the parts of the machine room to a lower side of the machine room to improve a mounting property of each member and modulation in use of the parts. The machine room bottom frame may be foamed to locate the part at a proper position corresponding to a mounted height for each part.

The refrigerant conduit may extend along a wall of the cavity to improve the space utilization without interfering with the inner space of the machine room. The refrigerant conduit may extend in a direction in which diagonals of the wall of the cavity are connected to each other to secure a sufficient heat exchange length of the refrigerant conduit. The refrigerant conduit may rise as it extends along the wall of the cavity.

A terminal cover may be disposed on a front side of the compressor to protect a terminal and drive the compressor without being affected by foreign substances in the narrow space.

In further another embodiment, a refrigerator for a vehicle includes a machine room defined in a side of a cavity or a compartment, a compressor disposed at a front side of the machine room, an evaporation module or assembly disposed at a rear portion of the cavity, a fourth passage that is a refrigerant passage connecting the evaporation module to the compressor and approximately extending upward from the rear side of the machine room and downward from the front side of the machine room, and a machine room cover covering the machine room. According to an embodiment, the machine room may be improved in space utilization.

The fourth passage may extend along a wall of the cavity, preferably, extend to come into contact with the wall to prevent an interference with other parts from occurring.

The fourth passage may have at least two curved sections, and thus, the fourth passage may be used as a regeneration heat exchange conduit.

According to the embodiment, the refrigerator which is improved in efficiency, increases in capacity therein, quickly performs the cooling, blocks the access of the foreign substances, and is reduced in noise, and the vehicle may be provided.

BRIEF DESCRIPTION OF THE DRAWINGS

Embodiments will be described in detail with reference to the following drawings in which like reference numerals refer to like elements, and wherein.

DETAILED DESCRIPTION

Figure 1:
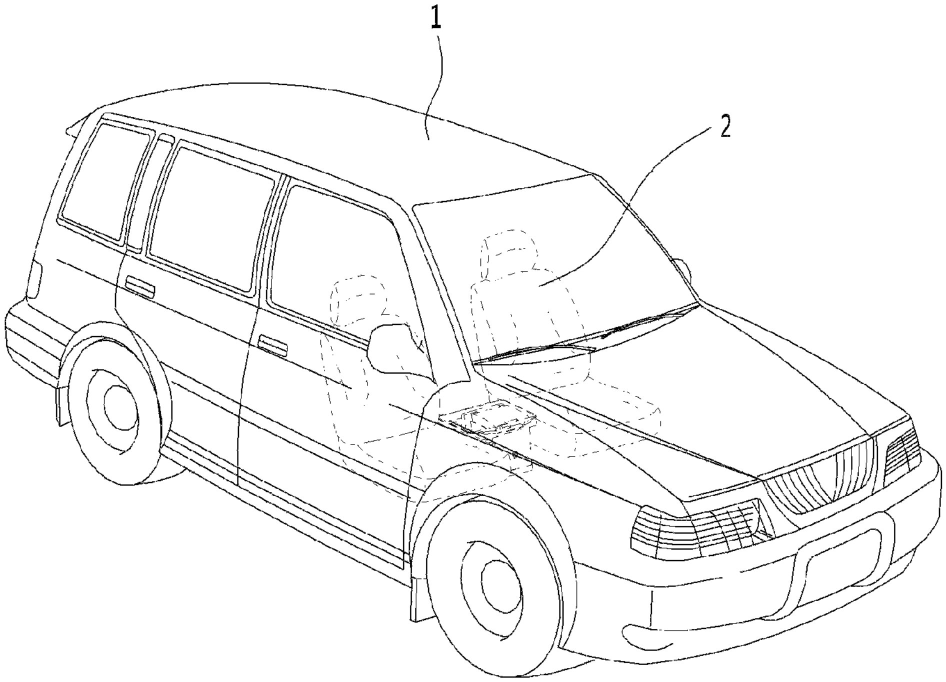
FIG. 1 is a perspective view of a vehicle according to an embodiment.

In the following description according to embodiments with reference to the drawings, the same reference numerals are given to different drawings in the case of the same constituents.

Also, in the description of each drawing, the description will be made with reference to the direction in which the vehicle is viewed from the front of the vehicle, rather than the front viewed by the driver based on the traveling direction of the vehicle. For example, the driver is on the right, and the assistant driver or passenger is on the left.

FIG. 1 is a perspective view of a vehicle according to an embodiment.

Referring to FIG. 1, a seat 2 on which a user is seated is provided in a vehicle 1. The seat 2 may be provided in a pair to be horizontally spaced apart from each other. A console is provided between the seats 2, and a driver places items that are necessary for driving or components that are necessary for manipulating the vehicle in the console. Front seats on which the driver and the assistant driver or passenger are seated may be described as an example of the seats 2.

It should be understood that the vehicle includes various components, which are necessary for driving the vehicle, such as a moving device such as a wheel, a driving device such as an engine, and a steering device such as a steering wheel.

The refrigerator for the vehicle according to an embodiment may be preferably placed in the console. However, an embodiment of the present disclosure is not limited thereto. For example, the vehicle refrigerator may be installed in various spaces. For example, the vehicle refrigerator may be installed in a space between rear seats, a door, a glove box, and a center fascia. This is one of factors that the vehicle refrigerator according to an embodiment is capable of being installed only when power is supplied, and a minimum space is secured. However, it is a great advantage of the embodiment in that it may be installed in the console between the seats, which is limited in space due to limitations in vehicle design.

Figure 2:
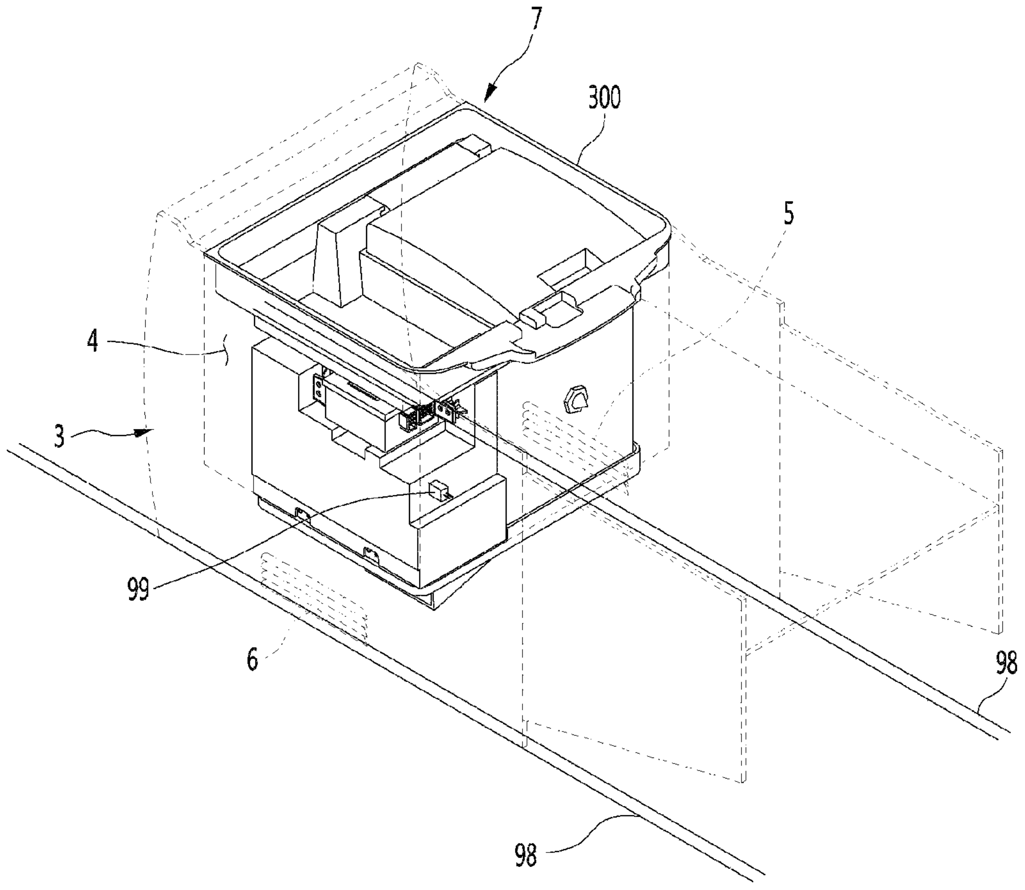
FIG. 2 is an enlarged perspective view illustrating a console of the vehicle.

FIG. 2 is an enlarged perspective view illustrating the console of the vehicle.

Referring to FIG. 2, a console 3 may be provided as a separate part that is made of a material such as a resin. A steel frame 98 may be further provided below the console 3 to maintain strength of the vehicle, and a sensor part or sensor 99 such as a sensor may be provided in a spacing part between the console 3 and the steel frame 98. The sensor part 99 may be a part that is necessary for accurately sensing an external signal and measuring a signal at a position of the driver. For example, an airbag sensor that directly impacts the life of the driver may be mounted.

The console 3 may have a console space 4 therein, and the console space 4 may be covered by a console cover or a cover 300. The console cover 300 may be fixed to the console 3 in a fixed type. Thus, it is difficult for external foreign substances to be introduced into the console through the console cover 300. A vehicle refrigerator 7 is seated in the console space 4.

A suction port 5 may be provided in a first or right surface of the console 3 to introduce air within the vehicle into the console space 4. The suction port 5 may face the driver. An exhaust port 6 may be provided in a second or left surface of the console 3 to exhaust warmed air while the vehicle refrigerator operates from the inside of the console space 4. The exhaust port 6 may face the assistant driver or passenger. A grill may be provided in each of the suction port 5 and the exhaust port 6 to prevent a user's hand from being inserted and thereby to provide safety, prevent a falling object from being introduced, and allow air to be exhausted to flow downward so as not to be directed to the person.

Figure 3:
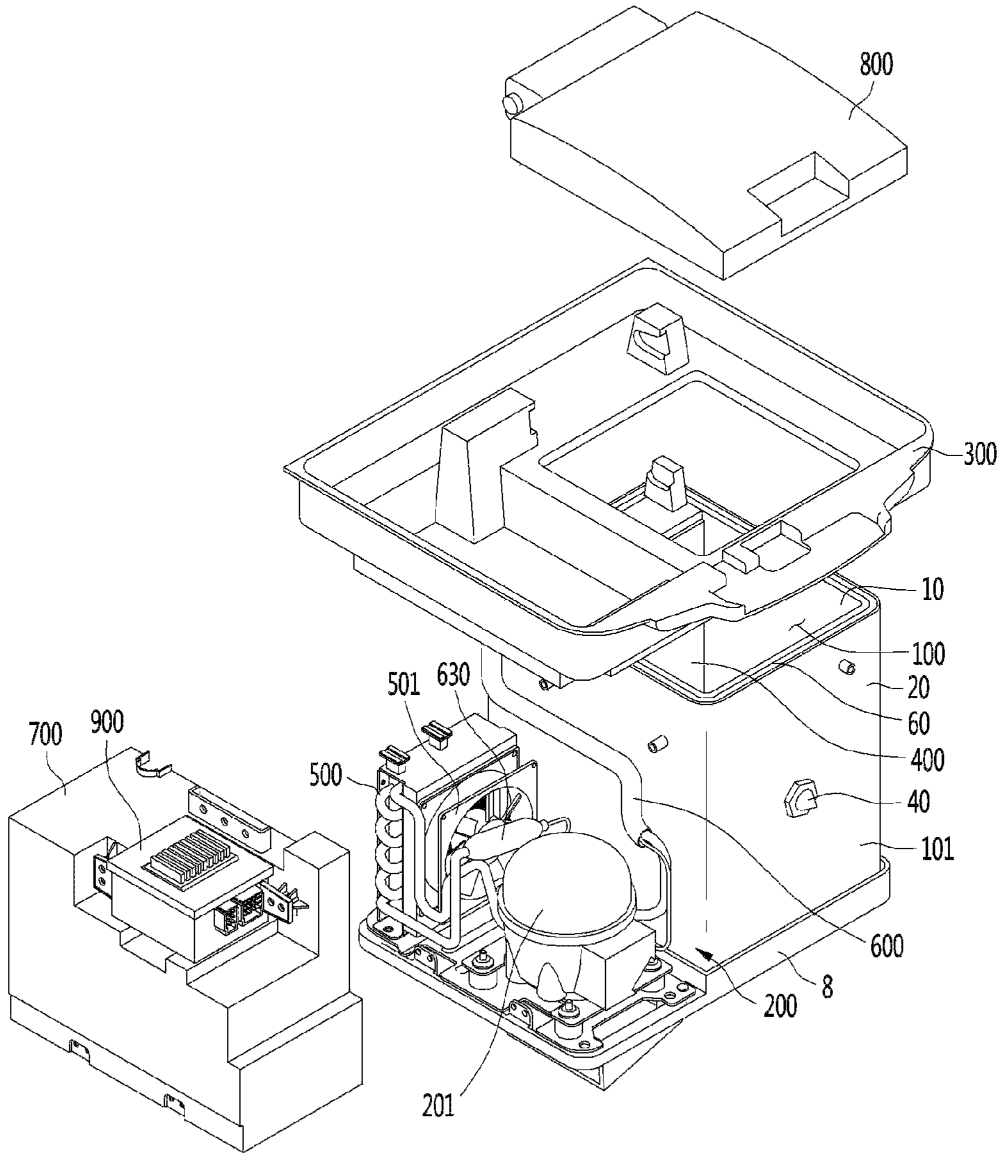
FIG. 3 is a schematic perspective view illustrating the inside of a vehicle refrigerator.

FIG. 3 is a schematic perspective view illustrating the inside of the vehicle refrigerator.

Referring to FIG. 3, the vehicle refrigerator 7 includes a refrigerator bottom frame or a refrigerator base 8 supporting parts, a machine room 200 provided in a left side of the refrigerator bottom frame 8, and a cavity or compartment 100 provided in a right side of the refrigerator bottom frame 8. The machine room 200 may be covered by a machine room cover 700, and an upper side of the cavity 100 may be covered by the console cover 300 and a door 800.

The machine room cover 700 may not only guide a passage of the cooling air, but also prevent foreign substances from being introduced into the machine room 200.

A controller 900 may be disposed on the machine room cover 700 to control an overall operation of the vehicle refrigerator 7. Since the controller 900 is installed at the above-described position, the vehicle refrigerator 7 may operate without problems in a proper temperature range in a narrow space inside the console space 4. That is to say, the controller 900 may be cooled by air flowing through a gap between the machine room cover 700 and the console cover 300 and separated from an inner space of the machine room 200 by the machine room cover 700. Thus, the controller 900 may not be affected by heat within the machine room 200.

The console cover 300 may not only cover an opened upper portion or top of the console space 4, but also cover an upper end edge of the cavity 100. A door 800 may be further installed on the console cover 300 to allow the user to cover an opening through which products are accessible to the cavity 100. The door 800 may be opened by using rear portions of the console cover 300 and the cavity 100 as hinge points. Here, the opening of the console cover 300, the door 800, and the cavity 100 may be performed by conveniently manipulating the door 800 by the user because the console cover 300, the door 800, and the cavity 100 are horizontally provided when viewed from the user and also disposed at a rear side of the console.

A condensation module or assembly 500, a dryer or drier 630, and a compressor 201 may be successively installed in the machine room 200 in a flow direction of the cooling air. A refrigerant conduit 600 for allowing the refrigerant to smoothly flow is provided in the machine room 200. A portion of the refrigerant conduit 600 may extend to the inside of the cavity 100 to supply the refrigerant. The refrigerant conduit 600 may extend to the outside of the cavity 100 through the upper opening through which the products are accessible to the cavity 100.

The cavity 100 has an opened top surface or a top opening and five surfaces that are covered by a vacuum adiabatic body 101.

The vacuum adiabatic body 101 may include a first plate member 10 providing a boundary of a low-temperature inner space of the cavity 100, a second plate member 20 providing a boundary of a high-temperature outer space, and a conductive resistance sheet 60 blocking heat transfer between the plate members 10 and 20. Since the vacuum adiabatic body 101 has a thin adiabatic thickness to maximally obtain adiabatic efficiency, a large capacity of the cavity 100 may be realized.

An exhaust and getter port or an exhaust port 40 for exhaust of the inner space of the vacuum adiabatic body 101 and for installing a getter that maintains the vacuum state may be provided on one surface. The exhaust and getter port 40 may provide an exhaust and getter together to better contribute to miniaturization of the vehicle refrigerator 7.

An evaporation module or assembly 400 may be installed in the cavity 100. The evaporation module 400 may forcibly blow evaporation heat of the refrigerant, which is introduced into the cavity 100 through the refrigerant conduit 600, into the cavity 100. The evaporation module may be disposed at a rear side within the cavity 100.

Figure 4:
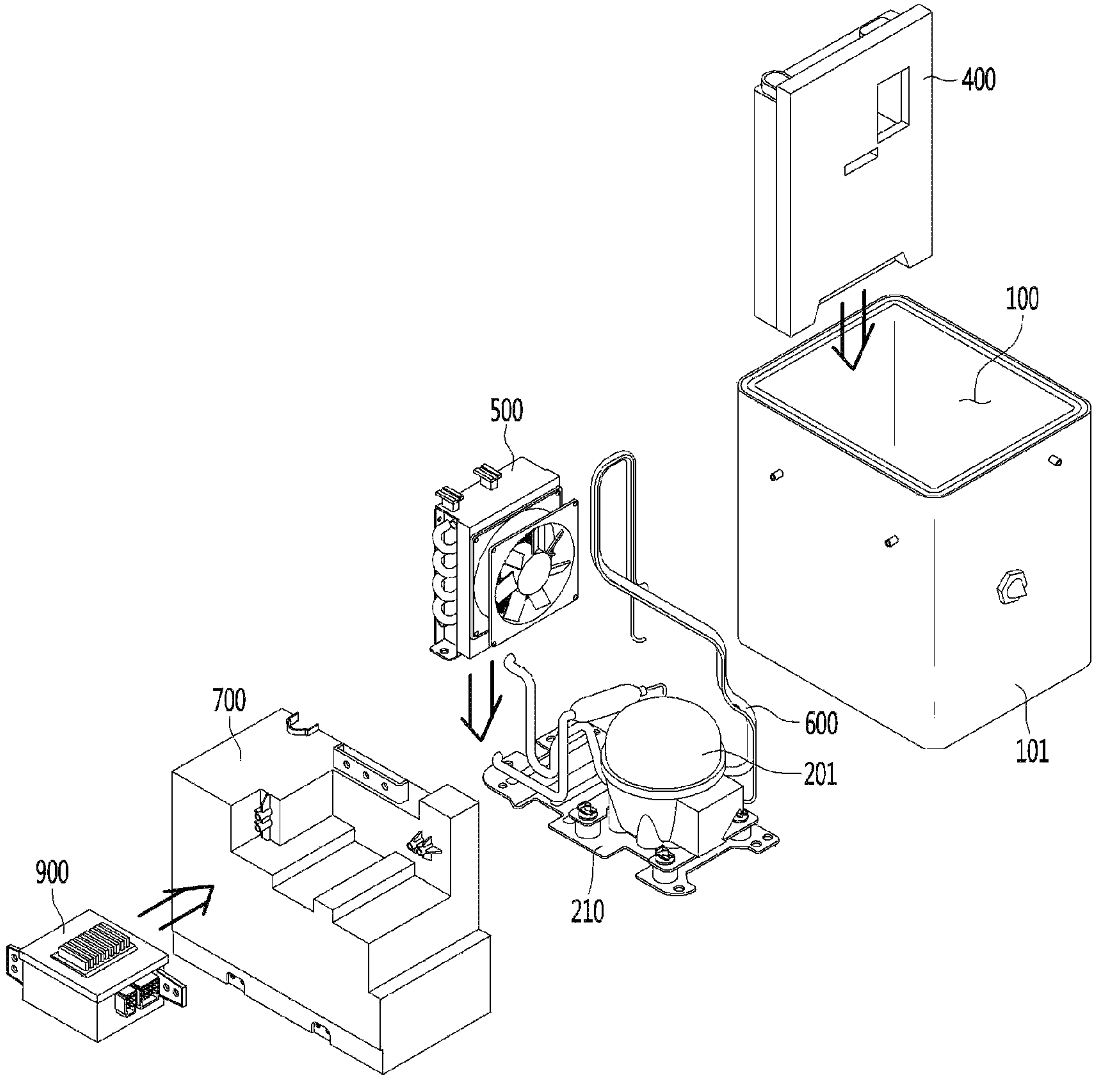
FIG. 4 is a view illustrating a connection relationship between a machine room and a cavity.

FIG. 4 is a view illustrating a connection relationship between the machine room and the cavity.

Referring to FIG. 4, the evaporation module 400 is accommodated into the cavity 100. That is to say, the evaporation module 400 is disposed in the inner space of the cavity 100 having the vacuum adiabatic body 101 as an outer wall. Thus, the machine room 200 may be improved in space efficiency, and the cavity 100 may increase in inner space.

The refrigerant conduit 600 guiding the refrigerant into the evaporation module 400 is guided to the evaporation module 400 by passing over the top surface of the cavity 100. It may be considered that the refrigerant conduit 600 passes through the vacuum adiabatic body 101 to reduce a volume thereof. However, since the vehicle has many vibrations, and the inside of the vacuum adiabatic body 101 is maintained in a considerably high vacuum state, the sealing of the contact portion between the refrigerant conduit 600 and the vacuum adiabatic body 101 may be damaged. Thus, it is not preferable that the refrigerant conduit 600 passes through the vacuum adiabatic body 101.

The evaporation module 400 may be preferably installed at the hinge point of the door within the cavity 100, i.e., a rear surface within the cavity 100. This is because a path that is necessary to allow the refrigerant conduit 600 to extend up to the evaporation module 400 is as short as possible for ensuring the internal volume of the cavity 100. It is more preferable that the refrigerant conduit 600 passing over the vacuum adiabatic body 101 passes through the hinge point of the door. If the evaporation module 400 is out of the hinge point of the door, the capacity of the cavity and the low-temperature energy may be lost due to the extension of the refrigerant conduit 600 and the adiabatic function of the refrigerant conduit 600.

The condensation module 500 may be coupled by a rear coupling unit of a machine room bottom frame or base 210. Air suctioned through the condensation module 500 may cool the compressor 201 and then be discharged downward from the compressor 201.

The machine room cover 700 may be coupled to a left side of the cavity 100 to cover the machine room 200. An air flow for cooling may occur in an upper side of the machine room cover 700, and the controller 900 may be provided on the cooling passage to perform sufficient cooling action.

Figure 5:
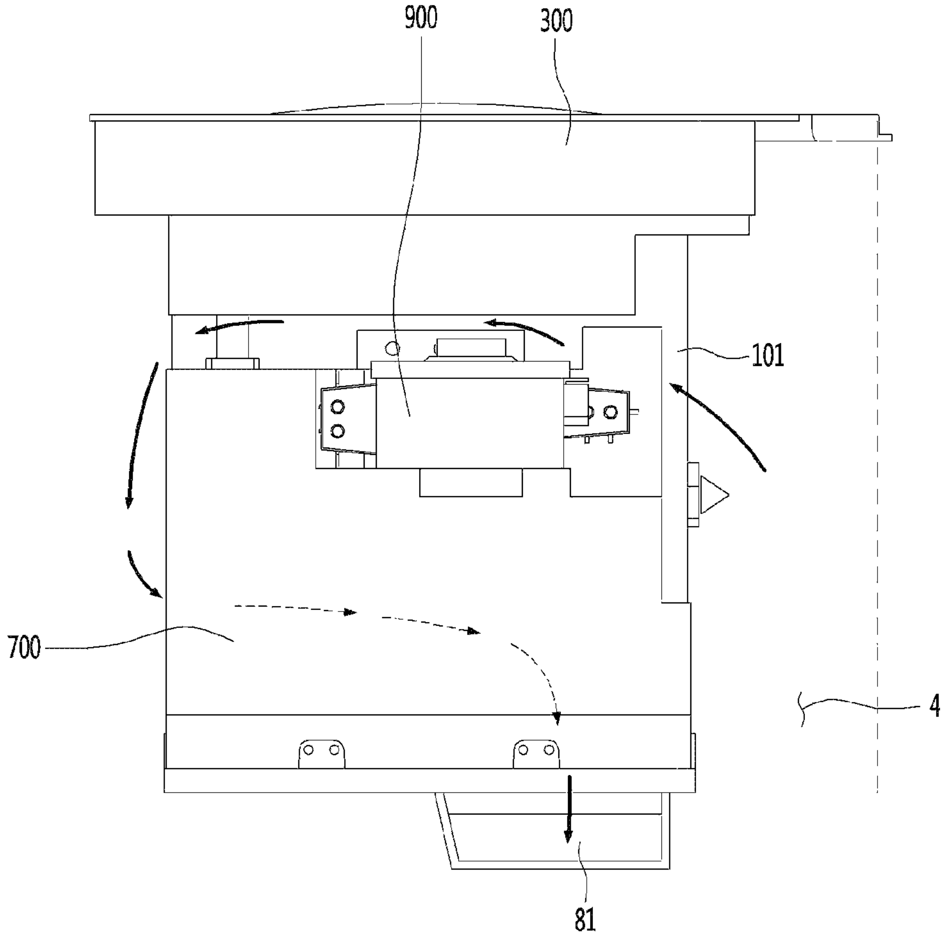
FIG. 5 is a left view of the vehicle refrigerator.

FIG. 5 is a left view of the vehicle refrigerator.

Referring to FIG. 5, air introduced into the suction port 5 moves to the machine room 200 through the spacing part between an outer surface of the vacuum adiabatic body 101, which corresponds to the front side of the cavity 100, and an inner surface of the console space 4. That is, the air moves to a left direction.

Thereafter, the air moves backward through the spacing part between the top surface of the machine room cover 700 and the bottom surface of the console cover 300 and then moves downward to be introduced into the machine room cover 700. For this, a large opening may be defined in a rear side of the machine room cover 700.

The air may successively cool the condensation module 500, a dryer 630, and the compressor 201 in the machine room cover 700 and then be discharged to the outside of the vehicle refrigerator 7 through a passage guide 81 provided below the compressor 201. The exhaust port 6 may be disposed close to the passage guide 81 to allow the air discharged through the passage guide 81 to circulate without staying in the console space 4. Thus, the cooling efficiency may be improved.

Figure 6:
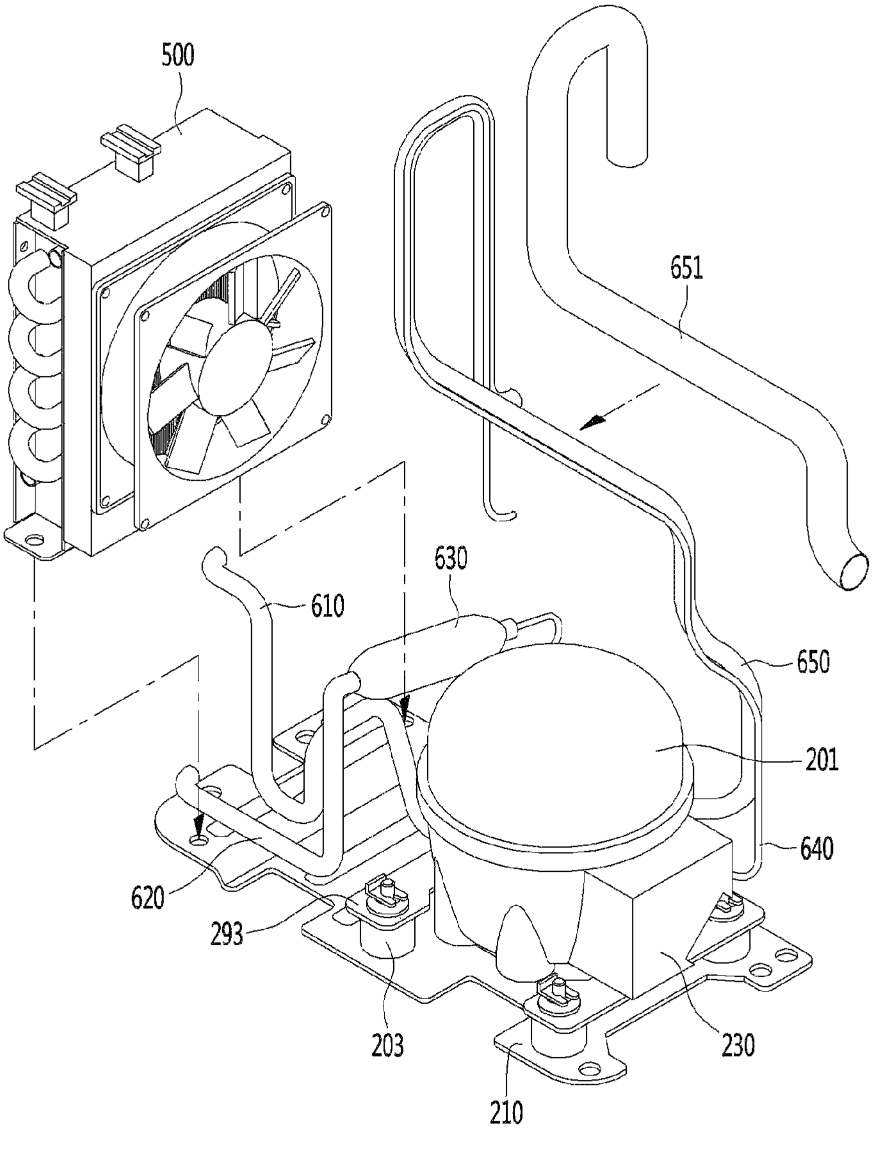
FIG. 6 is a view illustrating a configuration of the machine room.
Figure 7:
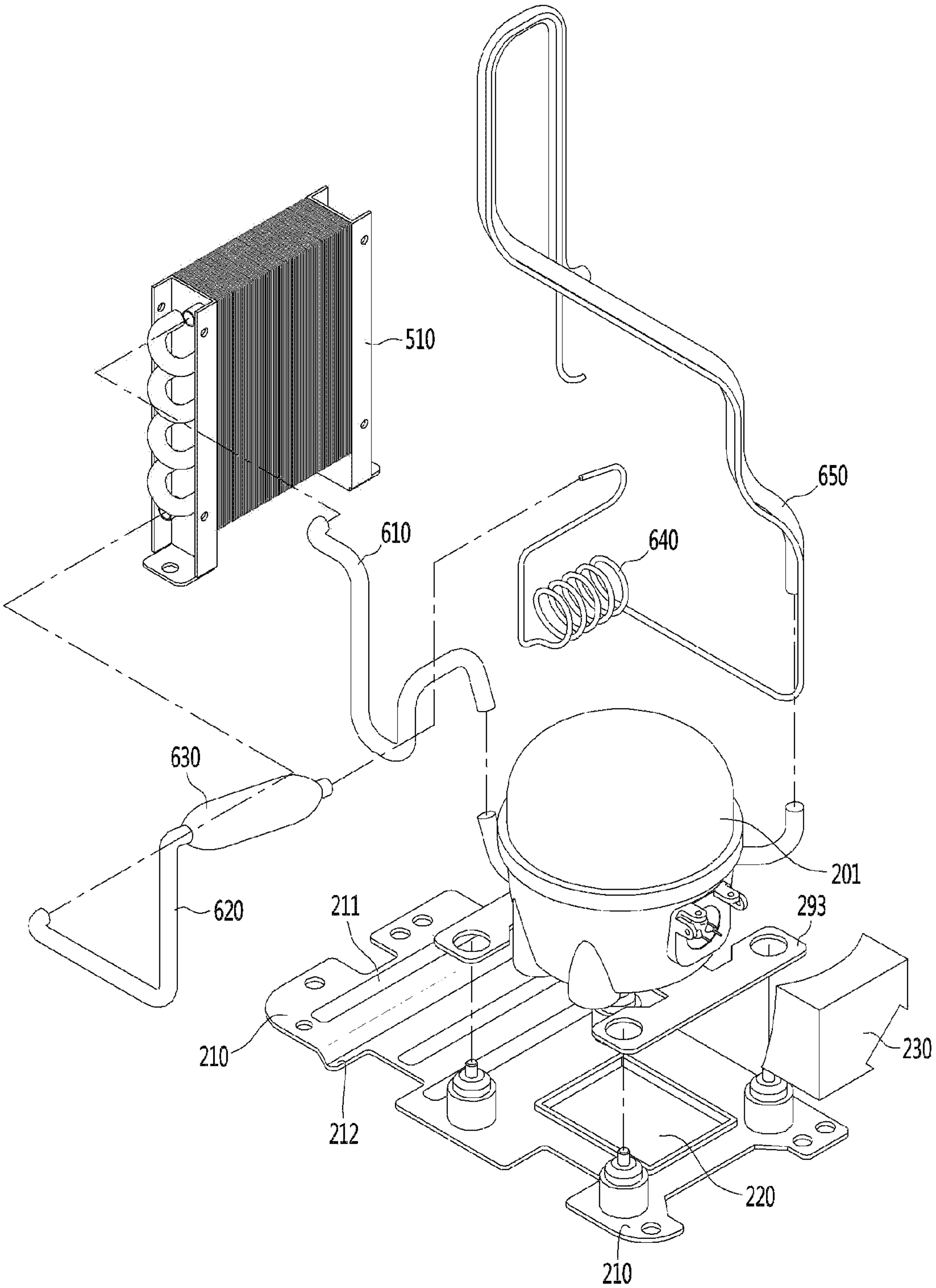
FIG. 7 is an exploded perspective view when each of parts in the machine room is viewed with respect to a flow of a refrigerant.
Figure 8:
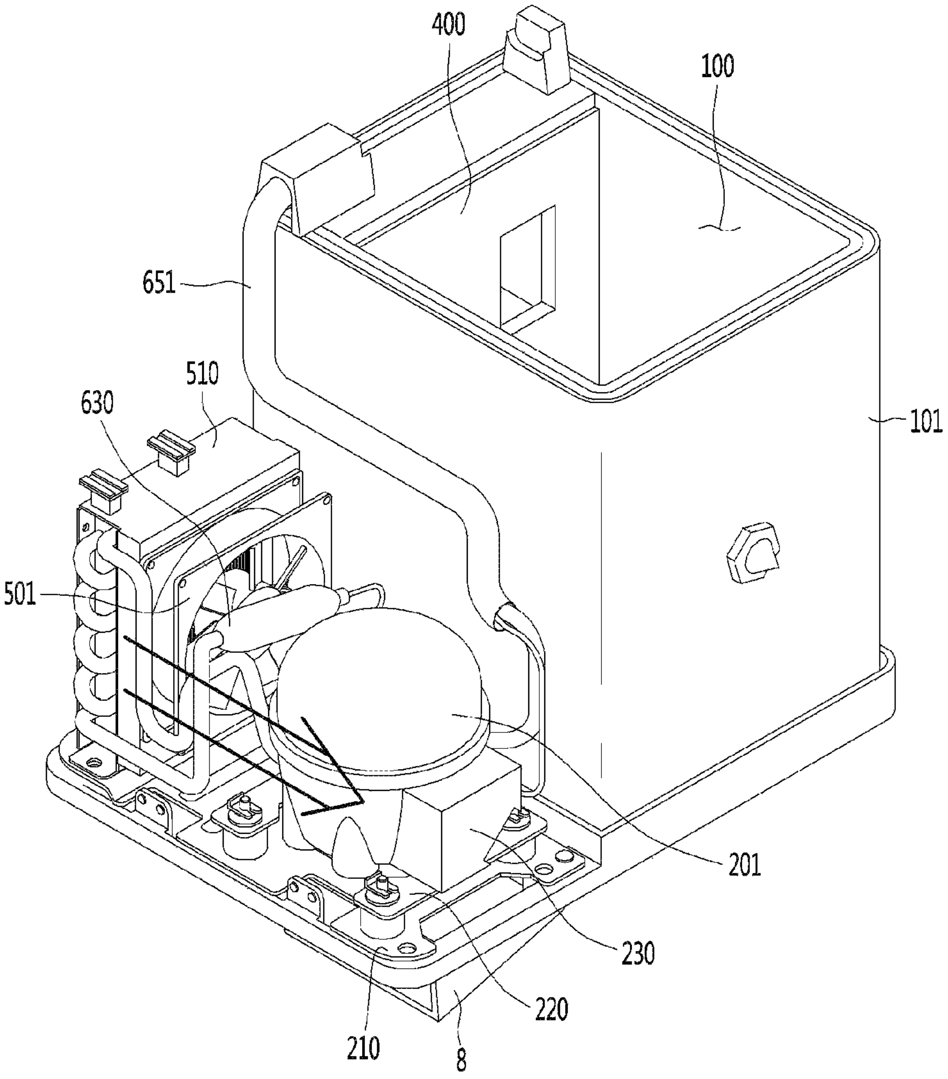
FIG. 8 is a perspective view illustrating only the machine room and the cavity.

FIG. 6 is a view illustrating a configuration of the machine room, FIG. 7 is an exploded perspective view when each of the parts in the machine room is viewed with respect to a flow of the refrigerant, and FIG. 8 is a perspective view illustrating only the machine room and the cavity. Some of the components are not shown for the sake of convenience.

Referring to FIGS. 6, 7, and 8, the condensation module 500 is fixed in a manner in which the condenser 510 is coupled to the machine room bottom frame 210, a condenser spacer (see reference numeral 505 of FIG. 10) is coupled to the condenser 510, and the condensation fan (see reference numeral 501 of FIG. 10) is coupled to the condenser spacer 505. The parts may be installed in the narrow space by the condensation module 500 having the above-described structure, and an occurrence of noise due to the condensation fan 501 may be reduced by the condenser spacer 505.

The condensation fan 501 may not increase infinitely in rotation rate due to the influence of the noise. According to experiments, it is confirmed that noise having a level of about 2,000 rpm does not affect the driver.

The condenser spacer 505 may solve limitations of noise due to rotation of fan blades, slip of air, and shock waves propagating through the air, secure a flow rate of the air, and achieve the compact inside of the machine room.

An operation in the machine room with respect to a flow or air will be described below.

The suctioned air in the condensation fan 501 may pass through the condenser 510 to condense the refrigerant. The air suctioned into the machine room 200 may pass through the dryer 630 and an expansion valve or conduit 640 and then cool the compressor 201 finally and be discharged to the outside. Here, the flow of the air may be a flow that proceeds forward from a rear side of the machine room 200.

To secure sufficient condensation performance in the condensation module 500, the air introduced into the machine room 200 cools the condenser 510 first. Also, since operation conditions of the compressor 201 are permissible even at a relatively high temperature, the introduced air of the machine room 200 cools the compressor 201 finally. The dryer 630 and the expansion valve 640 may be disposed between the condenser 510 and the compressor 201 to correspond to a use temperature of each part.

The air cooling the compressor 201 may be discharged through a machine room discharge hole 220 provided in the machine room bottom frame 210. The air discharged through the machine room discharge hole 220 may be discharged to the outside of the vehicle refrigerator 7 through the passage guide 81 of the refrigerator bottom frame 8.

A terminal or a compressor terminal supplying power to the compressor 201 is disposed at a front side of the compressor 201, i.e., a front side of the machine room 200, in which an influence of the air flow is less, in the machine room 200. This is for improving reliability of the product by making it difficult for dusts caused by the air flow to approach an electric system as much as possible. The compressor terminal may be covered from the outside by a compressor terminal cover 230.

An operation in the machine room 200 with respect to a flow or a refrigerant will be described below. In the drawings, the same original numbers are used to connect the points where the respective parts are connected, thereby facilitating understanding.

A refrigerant compressed in the compressor 201 is introduced to an upper side of the condenser 510 through a first passage 610 and then condensed by external air. Compression and condensation efficiency of the refrigerant is a major factor that determines overall cooling performance of the refrigeration cycle.

In the vehicle refrigerator 7 according to an embodiment, the compressor 201 operates at an operation frequency of maximum 60 Hz to suppress the occurrence of excessive noise. Also, to prevent problems in oil supply due to the vibration while the vehicle is driven, oil may be supplied at the highest level into the compressor 201. The condensation fan 501 is limited to the number of revolutions to about 2,000 rpm to suppress the excessive noise.

In this embodiment, it is confirmed that sufficient cooling performance is exhibited even under the operation conditions of the refrigeration cycle.

The condensed refrigerant is introduced into the dryer 630 through a second passage 620. The dryer 630 may be a receiver dryer or a receiver drier in which a function of a dryer and a function of a receiver are performed together. Thus, the inner space of the machine room 200 may be more reduced.

The refrigerant supplied from the dryer 630 may be supplied to the evaporation module 400 by passing through the expansion valve 640. The passage through the expansion valve 640 may be a third passage. The refrigerant evaporated in the evaporation module 400 is introduced again into the compressor 201 through a fourth passage or conduit 650.

The expansion valve 640 and the fourth passage 650 may regenerate heat through heat exchange. For this, the two conduits 640 and 650 are bent with the same shape to come into contact with each other. Also, the regeneration adiabatic member 651 may surround the two conduits 640 and 650 together to insulate the conduits 640 and 650 from the outside. The regeneration adiabatic member 651 may extend from an inlet end of the compressor 201 up to the evaporation module 400 so that sufficient heat regeneration occurs between the two conduits 640 and 650.

The regeneration adiabatic member 651 may further extend up to the inside of the evaporation module 400. Thus, dew formed by the heat exchange action between the two conduits 640 and 650 and the cold air is prevented from leaking to the outside of the cavity 100. Thus, failure in the machine room 200 may be prevented from occurring.

The parts within the machine room 200 are primarily supported by the machine room bottom frame 210. The machine room bottom frame 210 is coupled to the refrigerator bottom frame 8. The machine room bottom frame 210 includes a foaming part for reinforcing strength and reducing vibration.

The foaming part includes a second foaming part 212 disposed between a portion on which the condensation module 500 is disposed and a portion on which the compressor 201 is disposed and foamed at a relatively deep depth to prevent different operation frequencies from being affected with respect to each other and a first foaming part 211 for reducing the vibration generated in each part and the vehicle. The first foaming part 211 may be or include a groove, while the second foaming part 212 may be or include a bend or stepped portion in the machine room bottom frame 210. The foaming parts 211 and 212 may increase an inertia moment of the machine room bottom frame 210 to improve strength.

The compressor 201 is coupled to the machine room bottom frame 210 in a state of being fixed to a compressor bottom frame 293. A damper 203 is interposed in the contact part between the compressor bottom frame 293 and the machine room bottom frame 210 to prevent the vibration of the compressor from being transmitted to other parts and the outside as far as possible.

Figure 9:
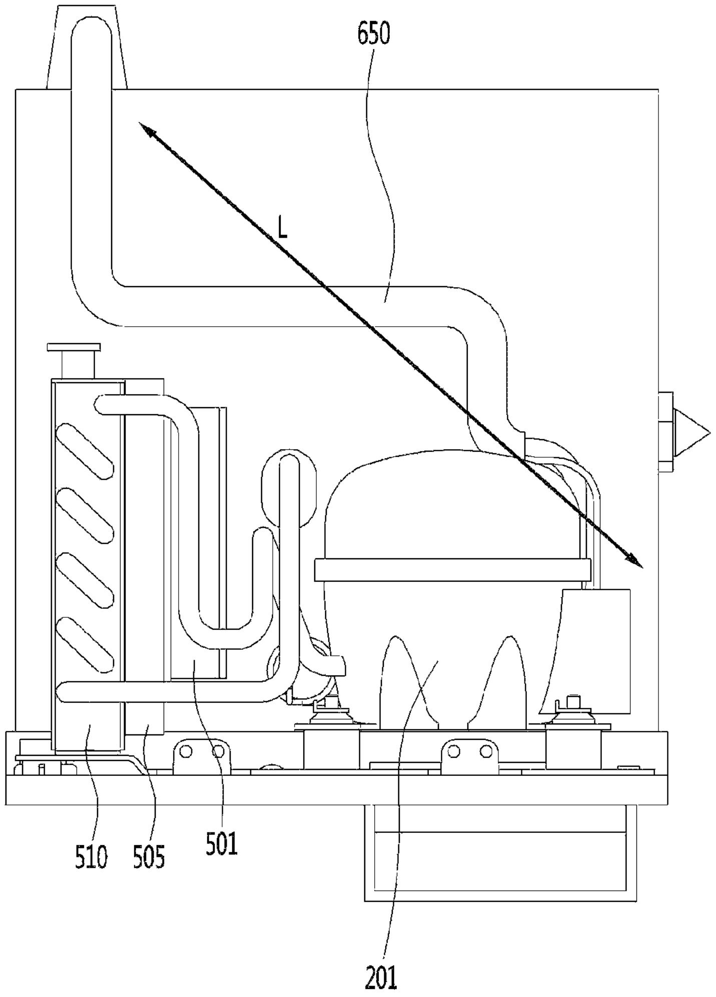
FIG. 9 is a schematic left view of the vehicle refrigerator.

FIG. 9 is a schematic left view of the vehicle refrigerator.

Referring to FIG. 9, the condensation module 500 is disposed at the rear side of the machine room 200, and the compressor 201 is disposed at the front side of the machine room 200. A suction-side conduit of the compressor 201 may be disposed at the front side of the machine room 200 by adjusting the position of the compressor 201. Thus, the heat regeneration path of the fourth passage 650 and the expansion valve 640 may be maximized in length.

In details, it is difficult to make a separate roofing for the heat regeneration in the narrow machine room 200. To overcome this limitation, in this embodiment, the suction side of the compressor may be disposed farthest from the suction side of the evaporation module 400 so that the conduit in which the heat regeneration is performed may be provided as long as possible. In the drawing, L represents the distance.

The fourth passage 650 and the expansion valve 640 may increase in length to maximally suppress the transmission of the vibration of the compressor to the evaporation module 400.

The regeneration adiabatic member 651 extends along an outer wall of the vacuum adiabatic body 101 defining the cavity 100. Since the conduit does not occupy the inner space of the machine room 200, the gap between the machine room cover 700 and the console cover 300 is made as large as possible to prevent the air flow from being obstructed.

The condensation module 500 has a structure in which the condenser spacer 505 may be interposed between the condenser 510 and the condensation fan 501. Thus, it is possible to achieve effects of ensuring the sufficient air volume and reducing the noise generation.

Figure 10:
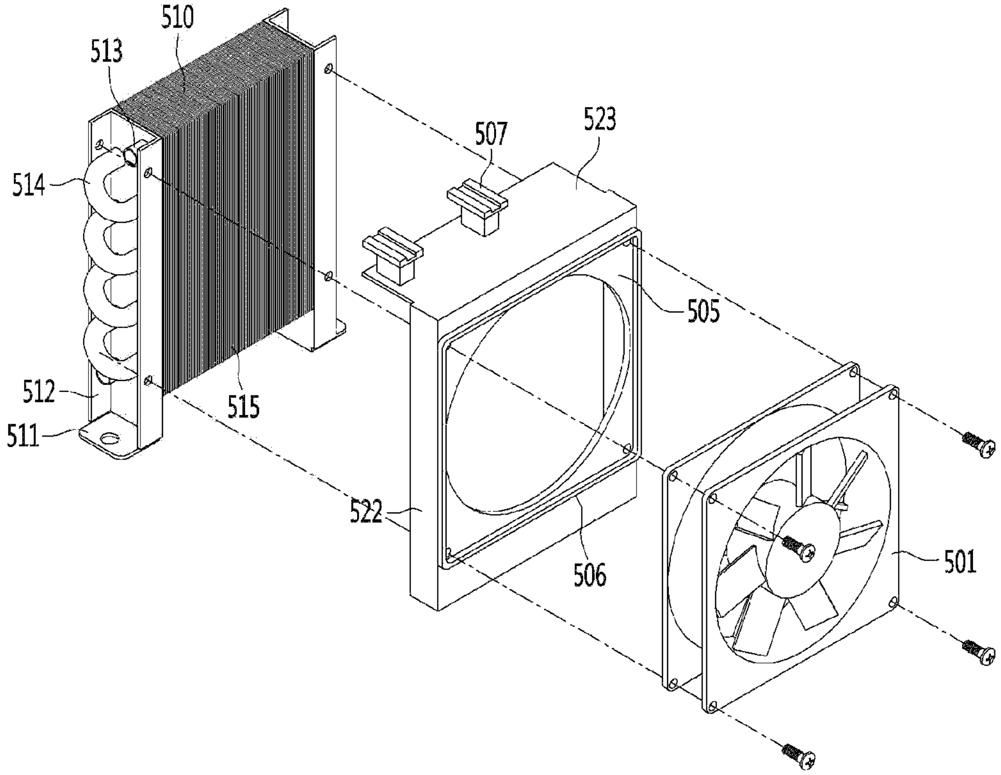
FIG. 10 is an exploded perspective view of a condensation module.

FIG. 10 is an exploded perspective view of the condensation module.

Referring to FIG. 10, fins 515 for heat exchange are densely disposed in the condenser 510, and a condenser frame 512 is disposed on each of both ends of an arranged structure of the fins 515. A U-shape tube 513 may pass through the fins 515 and the condenser frame 512, and the refrigerant may pass through the U-shaped tube 513. The U-shape tube 513 may form exposed sections 514 having a U-shape. A condenser coupling piece 511 may be disposed on a lower end of the condenser frame 512 to couple the condenser 510 to the machine room bottom frame.

Holes arranged with each other may be defined in the condenser 510, the condenser spacer 505, and the condensation fan 501. Thus, the condenser 510, the condenser spacer 505, and the condensation fan 501 may be coupled to each other by using a single coupling member.

A spacer placing part (or spacer or cover ledge) 523 disposed on an upper portion of the condenser 510 and a spacer part (or spacer wall) 522 extending downward from the spacer placing part 523 are disposed in the condenser spacer 505. The spacer part 522 may have a predetermined width to constantly maintain a distance between the condenser 510 and the condensation fan 501.

A condensation sealing part (or condensation seal) 506 may be disposed on a bottom surface of the spacer part 522, and thus, the condensation fan 501 may be placed in the condenser spacer 505 without having a gap therebetween. Thus, air suctioned into the condensation fan 501 may flow only through a circular hole within the condensation sealing part 506. On the other hand, a rear surface of the spacer part 522 may have a rectangular suction area corresponding to an installed area of the fins 515.

According to the above-described structure, since a large amount of air passing through the fins 515 is suctioned through the spacer part 522, the fins 515 may be entirely utilized to improve condensation efficiency. The air suctioned through the rectangular area may be aligned in a circular shape within a spacing range of the spacer part 522 to pass through the circular hole of the condensation sealing part 506. Thus, an occurrence of noise due to a slip phenomenon may be reduced to increase in air flow rate. The condensation fan 501 may be far away from an inner wall of the console space 4 to reduce flow resistance of the air, thereby contributing to the increase of the flow rate.

Figure 11:
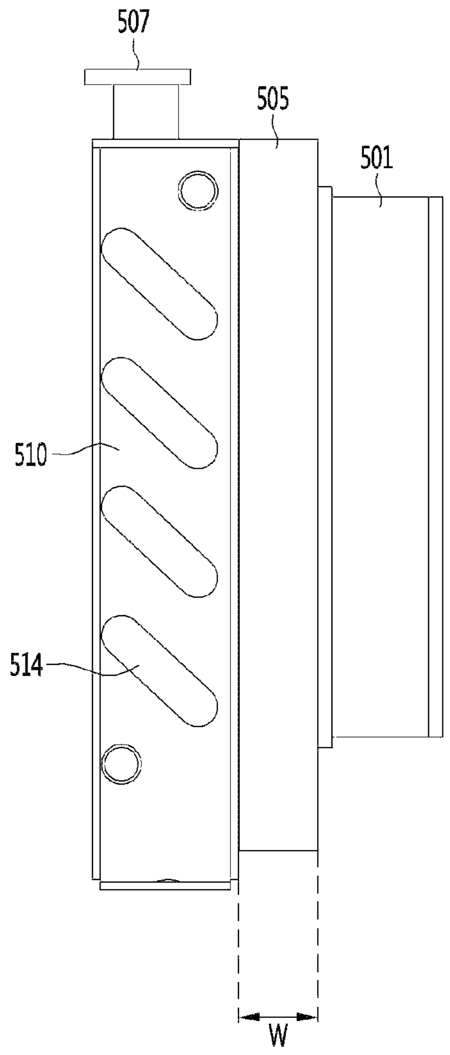
FIG. 11 is a side view of the condensation module.

FIG. 11 is a side view of the condensation module.

Referring to FIG. 11, in the condensation module 500, the condenser spacer 505 may be interposed between the condenser 510 and the condensation fan 501 to provide a predetermined width W of the spacing part 522. The spacing part 522 having the width W may reduce noise, enable high-capacity air suction, and reduce a shock wave due to the alignment of the flow.

Figure 12:
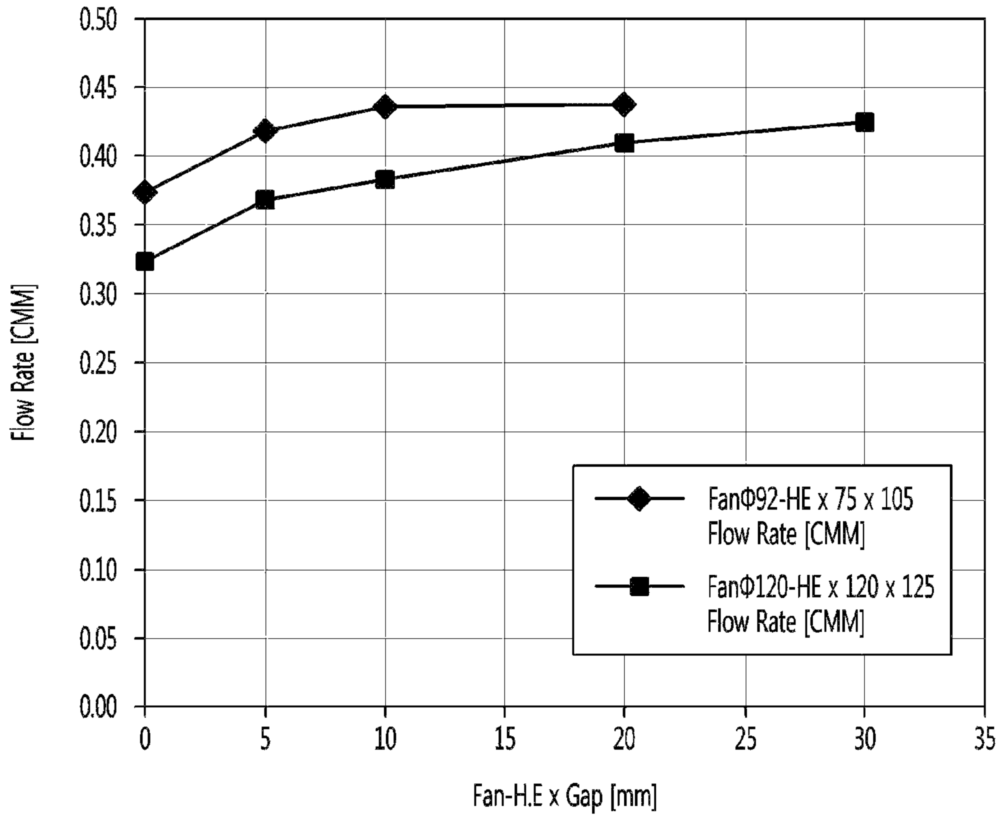
FIG. 12 is a graph illustrating results obtained by measuring a variation in flow rate according to a size of a condensation fan and a length of a spacing part.

FIG. 12 is a graph illustrating results obtained by measuring a variation in flow rate according to a size of the condensation fan 501 and a width of the spacing part 522. Referring to FIG. 12, an experiment was performed in two cases when the fan has a size of about 92 mm and about 120 mm. When the fan has a size of about 120 mm, the noise may increase. Thus, in terms of noise generation, the experiment was performed by adjusting the number of revolutions to a level approximately equal to that of the fan having a size of about 92 mm. When the fan has a size of about 92 mm, the experiment was performed under a condition of about 200 rpm.

As a result of the experiment, when the fan has a size of about 92 mm, it is seen that there is no problem in securing the air volume when the spacing part reaches about 5 mm to about 15 mm. In details, an effect of improving the air flow rate is almost converged at a distance of about 20 mm, and when the distance is about 5 mm, it reaches 95% of about 20 mm and 99% of about 15 mm. In the case of the preferred embodiment, a distance of about 10 mm may be applicable.

When the fan has a size of 120 mm, the more the spacing part decreases in distance, the air volume may significantly decrease. Also, since the numerical value at which the air volume converges in more than 30 mm, it is not preferable from the viewpoint of securing the air volume and reducing the noise. Also, it is difficult to apply the embodiment to the inside of the machine room 200 in terms of space utilization.

Figure 13:
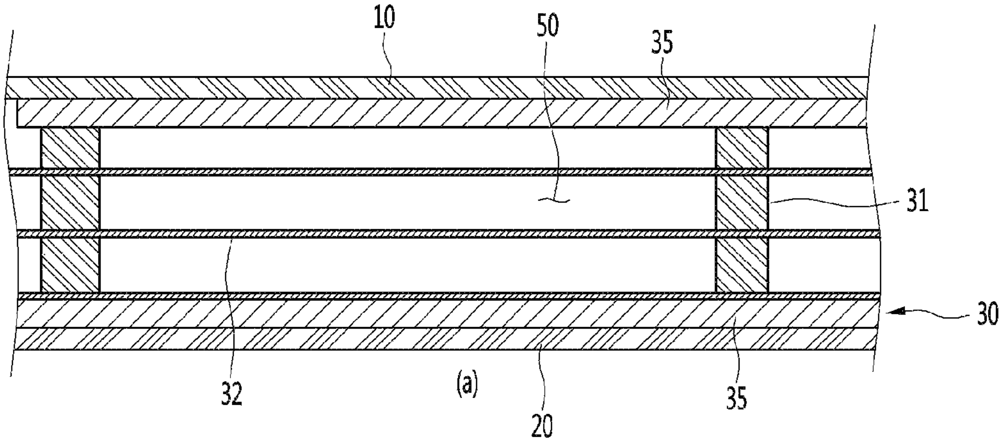
FIG. 13 is a view illustrating an internal configuration of a vacuum adiabatic body according to various embodiments.
Figure 13:
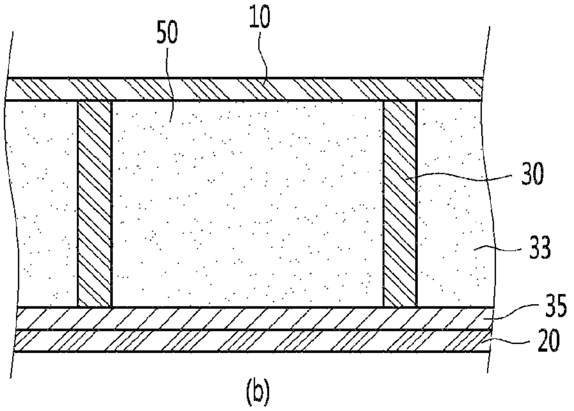
Figure 13:
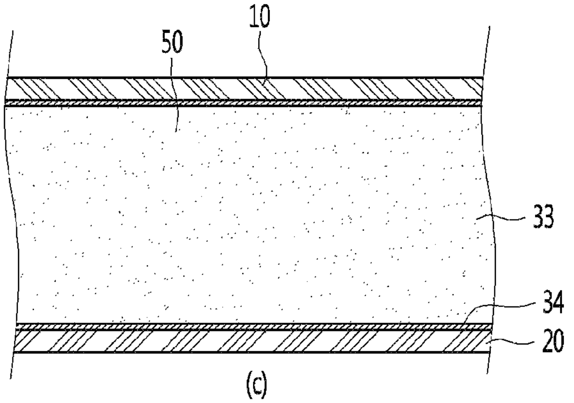

FIG. 13 is a view illustrating an internal configuration of a vacuum adiabatic body according to various embodiments.

First, referring to FIG. 13*a*, a vacuum space part 50 is provided in a third space having a different pressure from first and second spaces, preferably, a vacuum state, thereby reducing adiabatic loss. The third space may be provided at a temperature between the temperature of the first space and the temperature of the second space.

The third space is provided as a space in the vacuum state. Thus, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, adiabatic loss may be caused due to an increase in amount of heat radiation, caused by the contraction of the vacuum space part 50, and an increase in amount of heat conduction, caused by contact between the plate members 10 and 20.

A supporting unit 30 may be provided to reduce the deformation of the vacuum space part 50. The supporting unit 30 includes bars 31. The bars 31 may extend in a direction substantially vertical to the first and second plate members 10 and 20 so as to support a distance between the first and second plate members 10 and 20. A support plate 35 may be additionally provided to at least one end of the bar 31. The support plate 35 connects at least two bars 31 to each other, and may extend in a direction horizontal to the first and second plate members 10 and 20.

The support plate 35 may be provided in a plate shape, or may be provided in a lattice shape such that its area contacting the first or second plate member 10 or 20 is decreased, thereby reducing heat transfer. The bars 31 and the support plate 35 are fixed to each other at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 may be diffused through the support plate 35.

A material of the supporting unit 30 may include a resin selected from the group consisting of polycarbonate (PC), glass fiber PC, low outgassing PC, polyphenylene sulfide (PPS), and liquid crystal polymer (LCP) so as to obtain high compressive strength, low outgassing and water absorption, low thermal conductivity, high compressive strength at high temperature, and excellent machinability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members 10 and 20, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20.

A product having a low emissivity may be preferably used as the material of the radiation resistance sheet 32. In an embodiment, an aluminum foil having an emissivity of 0.02 may be used as the radiation resistance sheet 32. Also, at least one sheet of radiation resistance sheet 32 may be provided at a certain distance so as not to contact each other. At least one radiation resistance sheet 32 may be provided in a state in which it contacts the inner surface of the first or second plate member 10 or 20. Even when the vacuum space part 50 has a low height, one sheet of radiation resistance 32 sheet may be inserted. In case of the vehicle refrigerator 7, one sheet of radiation resistance sheet 32 may be inserted so that the vacuum adiabatic body 101 has a thin thickness, and the inner capacity of the cavity 100 is secured.

Referring to FIG. 13*b*, the distance between the plate members 10 and 20 is maintained by the supporting unit 30, and a porous substance 33 may be filled in the vacuum space part 50. The porous substance 33 may have a higher emissivity than the stainless material of the first and second plate members 10 and 20. However, since the porous substance 33 is filled in the vacuum space part 50, the porous substance 33 has a high efficiency for resisting the radiation heat transfer.

In this embodiment, the vacuum adiabatic body 101 may be fabricated without using the radiation resistance sheet 32.

Referring to FIG. 13*c*, the supporting unit 30 maintaining the vacuum space part 50 is not provided. Instead of the supporting unit 30, the porous substance 33 is provided in a state in which it is surrounded by a film 34. In this case, the porous substance 33 may be provided in a state in which it is compressed so as to maintain the gap of the vacuum space part 50. The film 34 is made of, for example, a polyethylene (PE) material, and may be provided in a state in which holes are formed therein.

In this embodiment, the vacuum adiabatic body may be fabricated without using the supporting unit 30. In other words, the porous substance 33 may simultaneously serve as the radiation resistance sheet 32 and the supporting unit 30.

Figure 14:
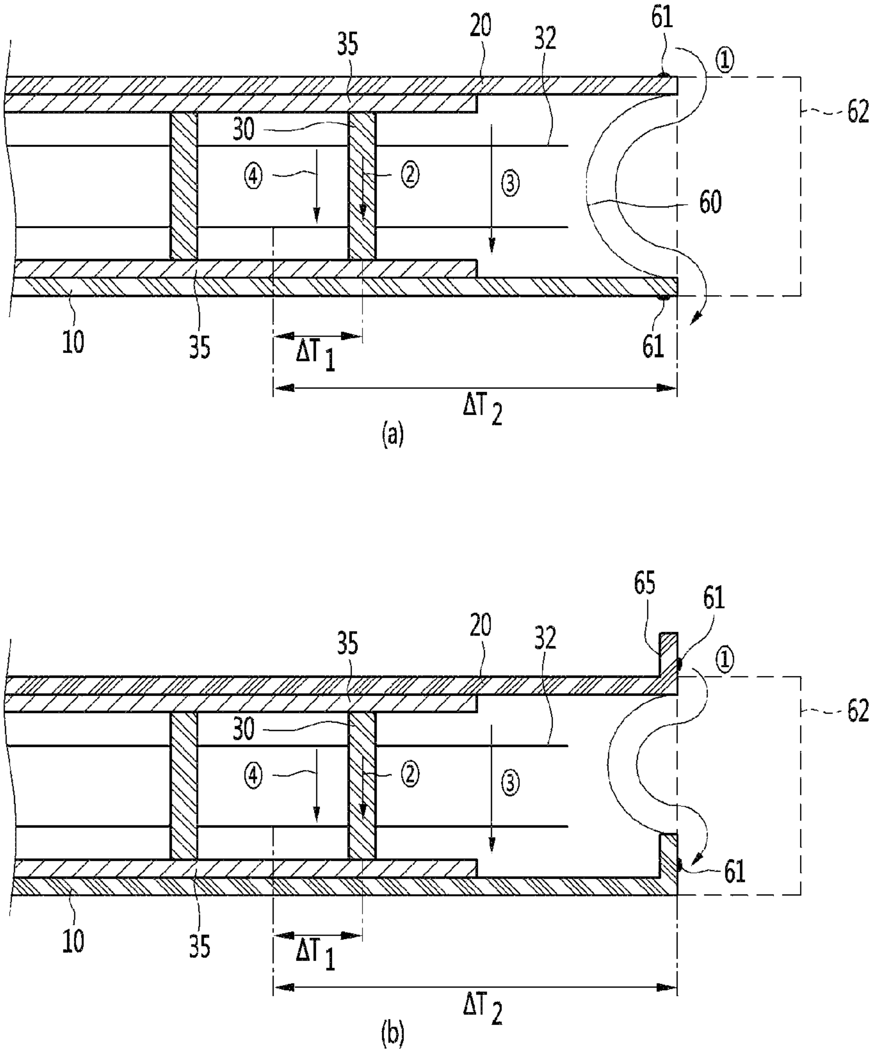
FIG. 14 is a view of a conductive resistance sheet and a peripheral portion of the conductive resistance sheet.

FIG. 14 is a view of a conductive resistance sheet and a peripheral portion of the conductive resistance sheet.

Referring to FIG. 14*a*, the first and second plate members 10 and 20 are to be sealed so as to vacuum the interior of the vacuum adiabatic body 101. In this case, since the two plate members 10 and 20 have different temperatures from each other, heat transfer may occur between the two plate members 10 and 20. A conductive resistance sheet 60 is provided to prevent heat conduction between two different kinds of plate members.

The conductive resistance sheet 60 may be provided with sealing parts 61 at which both ends of the conductive resistance sheet 60 are sealed to defining at least one portion of the wall for the third space and maintain the vacuum state. The conductive resistance sheet 60 may be provided as a thin foil in unit of micrometer so as to reduce the amount of heat conducted along the wall for the third space. The sealing parts 61 may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as cocking. The conductive resistance sheet 60 may be provided in a curved shape. Thus, a heat conduction distance of the conductive resistance sheet 60 is provided longer than the linear distance of each plate member, so that the amount of heat conduction may be further reduced.

A change in temperature occurs along the conductive resistance sheet 60. Therefore, in order to block heat transfer to the exterior of the conductive resistance sheet 60, a shielding part 62 may be provided at the exterior of the conductive resistance sheet 60 such that an adiabatic action occurs. In other words, in the vehicle refrigerator 7, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur.

In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous substance contacting an outer surface of the conductive resistance sheet 60, may be provided as an adiabatic structure, e.g., a separate gasket, which is placed at the exterior of the conductive resistance sheet 60, or may be provided as the console cover 300 disposed at a position facing the conductive resistance sheet 60.

A heat transfer path between the first and second plate members 10 and 20 will be described. Heat passing through the vacuum adiabatic body may be divided into surface conduction heat ① conducted along a surface of the vacuum adiabatic body 101, more specifically, the conductive resistance sheet 60, supporter conduction heat ② conducted along the supporting unit 30 provided inside the vacuum adiabatic body 101, gas conduction heat ③ conducted through an internal gas in the vacuum space part, and radiation transfer heat ④ transferred through the vacuum space part.

The transfer heat may be changed depending on various depending on various design dimensions. For example, the supporting unit 30 may be changed such that the first and second plate members 10 and 20 may endure a vacuum pressure without being deformed, the vacuum pressure may be changed, the distance between the plate members 10 and 20 may be changed, and the length of the conductive resistance sheet 60 may be changed. The transfer heat may be changed depending on a difference in temperature between the spaces (the first and second spaces) respectively provided by the plate members 10 and 20. In the embodiment, a preferred configuration of the vacuum adiabatic body 101 has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as about 19.6 mW/mK.

By performing a relative analysis on heat transfer amounts of the vacuum adiabatic body 101 of the embodiment, a heat transfer amount by the gas conduction heat ③ may become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ④ is smaller than the heat transfer amount by the solid conduction heat but larger than the heat transfer amount of the gas conduction heat ③. For example, the heat transfer amount by the radiation transfer heat ④ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math FIG. 1.

$$eK \text{ solid conduction heat} > eK \text{ radiation transfer heat} > eK \text{ gas conduction heat} \quad \text{[Math FIG. 1]}$$

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body 101 is a value given by $k=QL/A\Delta T$. Here, Q denotes a calorific value (W) and may be obtained using a calorific value of a heater. A denotes a sectional area (m2) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60, a sectional area (A) of the conductive resistance sheet, a length (L) of the conductive resistance sheet, and a thermal conductivity (k) of the conductive resistance sheet 60 (the thermal conductivity of the conductive resistance sheet 60 is a material property of a material and may be obtained in advance). For the supporter conduction heat, a conductive calorific value may be obtained through a temperature difference ($\Delta T$) between an entrance and an exit of the supporting unit 30, a sectional area (A) of the supporting unit 30, a length (L) of the supporting unit 30, and a thermal conductivity (k) of the supporting unit 30. Here, the thermal conductivity of the supporting unit 30 is a material property of a material and may be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous substance 33 is provided inside the vacuum space part 50, porous substance conduction heat ⑤ may be a sum of the supporter conduction heat ② and the radiation transfer heat ④. The porous substance conduction heat ⑤ may be changed depending on various variables including a kind, an amount, and the like of the porous substance 33.

In the second plate member 20, a temperature difference between an average temperature of the second plate 20 and a temperature at a point at which a heat transfer path passing through the conductive resistance sheet 60 meets the second plate 20 may be largest. For example, when the second space is a region hotter than the first space, the temperature at the point at which the heat transfer path passing through the conductive resistance sheet meets the second plate member 20 becomes lowest. Similarly, when the second space is a region colder than the first space, the temperature at the point at which the heat transfer path passing through the conductive resistance sheet 60 meets the second plate member 20 becomes highest.

This means that the amount of heat transferred through other points except the surface conduction heat passing through the conductive resistance sheet should be controlled, and the entire heat transfer amount satisfying the vacuum adiabatic body 101 may be achieved only when the surface conduction heat occupies the largest heat transfer amount. To this end, a temperature variation of the conductive resistance sheet 60 may be controlled to be larger than that of the plate member 20.

Physical characteristics of the parts constituting the vacuum adiabatic body 101 will be described. In the vacuum adiabatic body 101, a force by vacuum pressure is applied to all of the parts. Therefore, a material having strength (N/m2) of a certain level may be used.

Referring to FIG. 14*b*, this configuration is the same as that of FIG. 14*a* except that portions at which the first plate member 10, the second plate member 20 are coupled to the conductive resistance sheet 60. Thus, the same part omits the description and only the characteristic changes are described in detail.

Ends of the plate members 10 and 20 may be bent to the second space having a high temperature to form a flange part 65. A welding part 61 may be provided on a top surface of the flange part 65 to couple the conductive resistance sheet 60 to the flange part 65. In this embodiment, the worker may perform welding while facing only any one surface. Thus, since it is unnecessary to perform two processes, the process may be convenient.

It is more preferable to apply the case in which welding of the inside and the outside are difficult as illustrated in FIG. 14*a* because a space of the vacuum space part 50 is narrow like the vehicle refrigerator 7.

Figure 15:
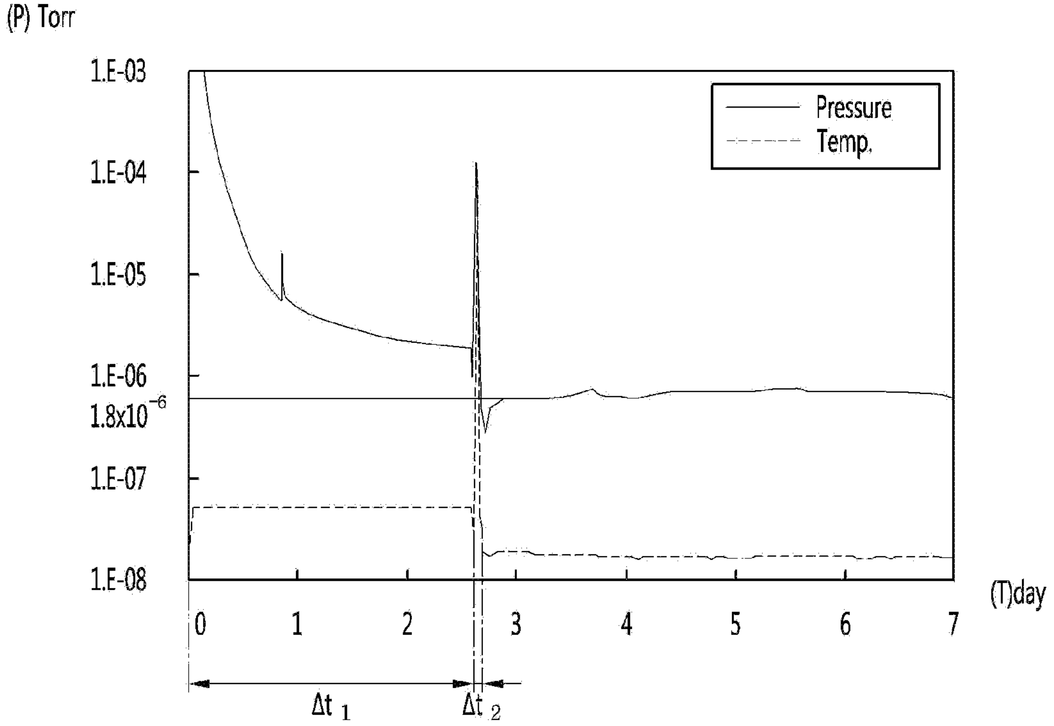
FIG. 15 is a graph illustrating results obtained by observing a time and a pressure in a process of exhausting the inside of the vacuum adiabatic body when a supporting unit is used.

FIG. 15 is a graph illustrating results obtained by observing a time and a pressure in a process of exhausting the inside of the vacuum adiabatic body 101 when a supporting unit 30 is used.

Referring to FIG. 15, in order to create the vacuum space part 50 to be in the vacuum state, a gas in the vacuum space part 50 is exhausted by a vacuum pump while evaporating a latent gas remaining in the parts of the vacuum space part 50 through heating. However, if the vacuum pressure reaches a certain level or more, there exists a point at which the level of the vacuum pressure is not increased any more ($\Delta t1$). After that, the getter is activated by disconnecting the vacuum space part 50 from the vacuum pump and applying heat to the vacuum space part 50 ($\Delta t2$). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8\times10^{-6}$ Torr.

In the embodiment, a point at which the vacuum pressure is not substantially decreased any more even though the gas is exhausted by operating the vacuum pump is set to the lowest limit of the vacuum pressure used in the vacuum adiabatic body 101, thereby setting the minimum internal pressure of the vacuum space part 50 to $1.8\times10^{-6}$ Torr.

Figure 16:
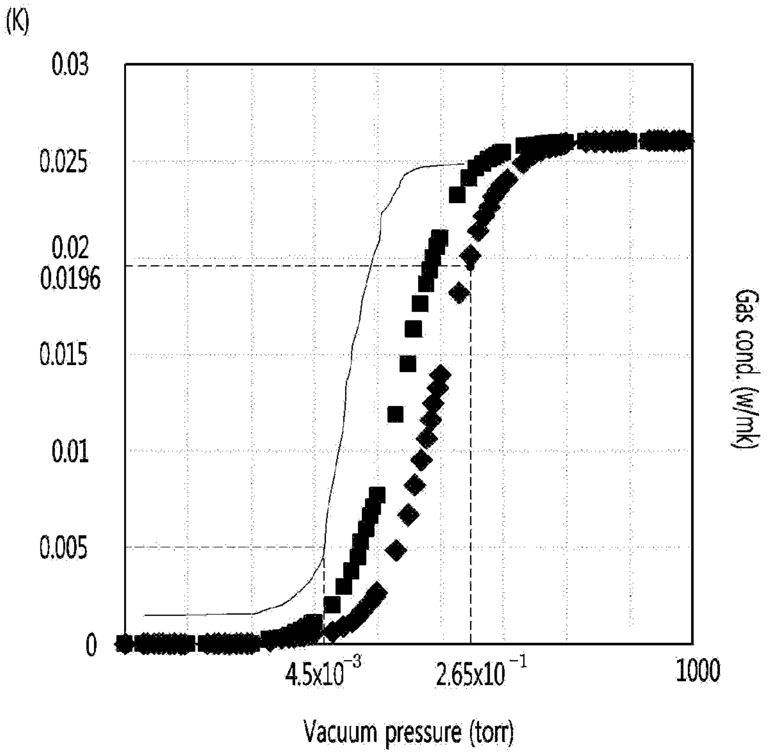
FIG. 16 is a graph illustrating results obtained by comparing a vacuum pressure with gas conductivity.

FIG. 16 is a graph obtained by comparing a vacuum pressure with gas conductivity.

Referring to FIG. 16, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside vacuum space part 50, the gap is a distance between the radiation resistance sheet 32 and the plate member 10 or 20 adjacent thereto.

When the radiation resistance sheet 32 does not exist inside vacuum space part 50, the gap is a distance between the first and second plate members 10 and 20.

It may be seen that, since the size of the gap is small at a point corresponding to a typical effective heat transfer coefficient of 0.0196 W/mK, which is provided to an adiabatic material formed by foaming polyurethane, the vacuum pressure is $2.65\times10^{-1}$ Torr even when the size of the gap is 2.76 mm. Meanwhile, it may be seen that the point at which reduction in adiabatic effect caused by gas conduction heat is saturated even though the vacuum pressure is decreased is a point at which the vacuum pressure is approximately $4.5\times10^{-3}$ Torr. The vacuum pressure of $4.5\times10^{-3}$ Torr may be defined as the point at which the reduction in adiabatic effect caused by gas conduction heat is saturated. Also, when the effective heat transfer coefficient is 0.1 W/mK, the vacuum pressure is $1.2\times10^{-2}$ Torr.

When the vacuum space part 50 is not provided with the supporting unit 30 but provided with the porous substance 33, the size of the gap ranges from a few micrometers to a few hundreds of micrometers. In this case, the amount of radiation heat transfer is small due to the porous substance 33 even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0\times10^{-4}$ Torr. Also, the vacuum pressure at the point at which the reduction in adiabatic effect caused by gas conduction heat is saturated is approximately $4.7\times10^{-2}$ Torr. Also, the pressure where the reduction in adiabatic effect caused by gas conduction heat reaches the typical effective heat transfer coefficient of 0.0196 W/mK is 730 Torr.

When the supporting unit 30 and the porous substance 33 are provided together in the vacuum space part, a vacuum pressure may be created and used, which is middle pressure between the vacuum pressure when only the supporting unit 30 is used and the vacuum pressure when only the porous substance 33 is used.

According to the embodiments, the vehicle refrigerator 7 that receives only power from the outside and is independent apparatus may be efficiently realized.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An adiabatic body comprising:

a first plate of a first temperature;

a second plate of a second temperature different than the first temperature; and a seal that closes a space between the first plate and the second plate such that the space has a third temperature between the first and second temperatures and is in a vacuum state, wherein the adiabatic body is configured to form a compartment to store a product, wherein a machine room is provided at a side of the compartment, wherein a condensation assembly is provided in the machine room, wherein the condensation assembly includes a condenser, a spacer, and a fan, wherein the spacer includes:

a spacer cover configured to be positioned over at least a portion of the condenser; and a spacer wall extending downward from the spacer cover and having a predetermined width to maintain a distance between the condenser and the fan, wherein the spacer is interposed between the condenser and the fan to provide spacing of a predetermined width W, wherein the spacer supports the rear of the fan and separates the fan from the condenser, wherein the fan is placed on a bottom surface of the spacer wall without having a gap therebetween, wherein the fan is placed outside the spacer as a whole, and wherein holes arranged with each other are defined in the condenser, the spacer, and the fan, such that the condenser, the spacer, and the fan are coupled to each other by a coupling member.

2. The adiabatic body according to claim 1, wherein the condensation assembly is coupled to a machine room base.

3. The adiabatic body according to claim 1, wherein the condensation assembly is provided at a rear side of the machine room, and a compressor is provided at a front side of the machine room to compress a refrigerant.

4. The adiabatic body according to claim 1, wherein a door is provided on one side of the compartment, and the door is coupled to the compartment with a hinge to open and close an opening of the compartment, and wherein a refrigerant conduit is provided to bypass the adiabatic body and pass through the hinge where the hinge is coupled.

5. The adiabatic body according to claim 1, wherein the spacer includes a hole, and the condenser, the spacer, and the fan are positioned such that air from the fan flows through the hole and to the condenser.

6. The adiabatic body according to claim 1, wherein a compressor is provided toward a front of the machine room to compress a refrigerant, an evaporation module is provided in the compartment, and the refrigerant condensed in the condensation assembly is supplied and evaporated in the evaporation module, wherein an expansion valve is provided between the condensation assembly and the compressor for supplying refrigerant supplied to the evaporation module, and a passage is provided for introducing refrigerant evaporated in the evaporation module into the compressor, and wherein the expansion valve and the passage are bent with a same shape to come into contact with each other for regenerating heat through a heat exchange.

7. The adiabatic body according to claim 1, wherein at least one ledge is provided on the spacer cover.

8. The adiabatic body according to claim 1, wherein the spacer has a face that is shaped to correspond to a shape of the condenser, and has a discharge hole that is shaped to correspond to a shape of the fan.

9. The adiabatic body according to claim 1, wherein the condenser is provided at the rear side of the machine room, wherein a compressor is provided at the front side of the machine room, and wherein a suction conduit is provided at the compressor, and the suction conduit is disposed at the front side of the machine room.

10. The adiabatic body according to claim 9, wherein the condenser includes fins configured to heat exchange.

11. The adiabatic body according to claim 10, wherein the condenser includes a condenser frame coupled to ends of the fins.

12. The adiabatic body according to claim 10, wherein the condenser is coupled to a machine room base.

13. The adiabatic body according to claim 10, wherein the condenser includes a U-shape tube configured to pass through the fins and the condenser frame, refrigerant passing through the U-shaped tube.

14. The adiabatic body according to claim 9, wherein an evaporation module is provided in one side of the compartment.

15. The adiabatic body according to claim 9, wherein a conduit is provided in the machine room, and extends into the compartment.

16. The adiabatic body according to claim 1, wherein the seal is coupled to the first plate and the second plate to provide the space that has the third temperature between the first and second temperatures and is in the vacuum state, wherein the vacuum space has a pressure of 1.8x10−6 Torr to 4.5x10−3 Torr, wherein the compartment has an opened one surface or one opening and other surfaces that are covered by the adiabatic body, wherein a conduit is provided in the machine room, and extends into the compartment, and wherein the conduit includes a portion extending along the surface of the compartment from the outside of the compartment.

17. An adiabatic body comprising:

a first plate of a first temperature;

a second plate of a second temperature different than the first temperature; and a seal that closes a space between the first plate and the second plate such that the space has a third temperature between the first and second temperatures and is in a vacuum state;

wherein the adiabatic body is configured to form a compartment to store a product, wherein a machine room is provided at a side of the compartment, wherein a condensation assembly is provided in the machine room, wherein the condensation assembly includes a condenser, a spacer, and a fan, wherein the spacer includes a spacer cover configured to be positioned over at least a portion of the condenser, and a spacer wall extending downward from the spacer cover, and wherein a condensation seal is provided on a bottom surface of the spacer wall.

18. An adiabatic body comprising:

a first plate of a first temperature;

a second plate of a second temperature different than the first temperature; and a seal that closes a space between the first plate and the second plate such that the space has a third temperature between the first and second temperatures and is in a vacuum state;

wherein the adiabatic body is configured to form a compartment to store a product, wherein a machine room is provided at a side of the compartment, and wherein a condensation assembly is provided in the machine room, wherein the condensation assembly includes a condenser, a spacer and a fan, wherein the spacer is interposed between the condenser and the fan to provide spacing of a predetermined width W, and wherein the predetermined width W of the spacing is 5 mm to 15 mm.

* * * * *